(12) United States Patent
Narita

(10) Patent No.: US 9,371,399 B2
(45) Date of Patent: Jun. 21, 2016

(54) METHODS FOR PRODUCING ALKALI CELLULOSE AND CELLULOSE ETHER

(75) Inventor: Mitsuo Narita, Niigata-ken (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 825 days.

(21) Appl. No.: 13/398,393

(22) Filed: Feb. 16, 2012

(65) Prior Publication Data

US 2012/0214981 A1    Aug. 23, 2012

(30) Foreign Application Priority Data

Feb. 21, 2011    (JP) .................. 2011-034471

(51) Int. Cl.
    C08B 1/08      (2006.01)
    C08B 11/08     (2006.01)
    C08B 11/20     (2006.01)
    C08B 11/193    (2006.01)
    C08B 11/00     (2006.01)

(52) U.S. Cl.
    CPC . *C08B 1/08* (2013.01); *C08B 11/00* (2013.01); *C08B 11/193* (2013.01)

(58) Field of Classification Search
    CPC ............ C08B 1/08; C08B 11/08; C08B 11/20
    USPC .............................................. 536/124, 61, 85
    See application file for complete search history.

(56) References Cited

U.S. PATENT DOCUMENTS

| | | | |
|---|---|---|---|
| 2,054,299 A | 9/1936 | Richter | |
| 2,138,014 A | 11/1938 | Richter | |
| 2,469,764 A | 5/1949 | Erickson | |
| 3,943,233 A | 3/1976 | Swanson et al. | |
| 4,117,223 A | 9/1978 | Lodige et al. | |
| 4,310,663 A | 1/1982 | Hilbig et al. | |
| 4,316,982 A | 2/1982 | Holst et al. | |
| 4,363,784 A | 12/1982 | Hilbig et al. | |
| 4,410,693 A | 10/1983 | Gibson et al. | |
| 4,508,895 A | 4/1985 | Balser | |
| 4,612,345 A | 9/1986 | Hess | |
| 8,017,766 B2 | 9/2011 | Narita et al. | |
| 8,496,782 B2 | 7/2013 | Narita | |
| 2007/0144692 A1 | 6/2007 | Narita et al. | |
| 2007/0149771 A1 | 6/2007 | Narita et al. | |
| 2007/0149772 A1 | 6/2007 | Narita et al. | |
| 2007/0149773 A1 | 6/2007 | Narita et al. | |
| 2007/0149774 A1 | 6/2007 | Narita et al. | |
| 2008/0003429 A1 | 1/2008 | Luo et al. | |
| 2009/0071377 A1 | 3/2009 | Wohrmeyer et al. | |
| 2009/0165971 A1 | 7/2009 | Narita | |
| 2009/0165972 A1 | 7/2009 | Narita | |

FOREIGN PATENT DOCUMENTS

| | | |
|---|---|---|
| CN | 1990507 A | 7/2007 |
| CN | 101096431 A | 1/2008 |
| EP | 1 734 055 A2 | 12/2006 |
| EP | 1 803 736 | 7/2007 |
| EP | 1 803 737 A1 | 7/2007 |
| EP | 1 803 738 A1 | 7/2007 |
| EP | 1 803 739 A1 | 7/2007 |
| EP | 1 873 302 A2 | 1/2008 |
| EP | 1 878 752 A1 | 1/2008 |
| JP | 126608 | 6/1938 |
| JP | 35-8347 B | 7/1960 |
| JP | 36-17641 B | 9/1961 |
| JP | 47-003964 B | 2/1972 |
| JP | 47-003965 B | 2/1972 |
| JP | 48-019232 B | 6/1973 |
| JP | 48-026385 B | 8/1973 |
| JP | 53-041356 A | 4/1978 |
| JP | 55-145701 A | 11/1980 |
| JP | 56-002302 A | 1/1981 |
| JP | 3073562 B | 11/1983 |
| JP | 59-056401 A | 3/1984 |
| JP | 60 040101 A | 3/1985 |
| JP | 61-264001 A | 11/1986 |
| JP | 64-085201 A | 3/1989 |
| JP | 10-158302 A | 6/1998 |
| JP | 10-279601 A | 10/1998 |
| JP | 2000-506215 A | 5/2000 |
| JP | 2001-002701 A | 1/2001 |
| JP | 2001-302701 A | 10/2001 |
| JP | 2003-171401 A | 6/2003 |
| JP | 2003-183301 A | 7/2003 |
| JP | 2005-008827 A | 1/2005 |
| JP | 2005-239845 A | 9/2005 |
| JP | 2006-348177 A | 12/2006 |
| JP | 2007-197677 A | 8/2007 |
| JP | 2007-197678 A | 8/2007 |
| JP | 2007-197679 A | 8/2007 |
| JP | 2007-197680 A | 8/2007 |
| JP | 2007-197681 A | 8/2007 |
| JP | 2007-197682 A | 8/2007 |
| JP | 4087534 B2 | 2/2008 |
| JP | 2009-155534 A | 7/2009 |
| JP | 2009-173907 A | 8/2009 |
| JP | 2009-528972 A | 8/2009 |
| WO | WO 97/33918 A1 | 9/1997 |
| WO | WO 2007/023513 A1 | 3/2007 |

OTHER PUBLICATIONS

Extended Search Report for Application No. EP 12 15 6041.1 dated Jun. 29, 2012.

(Continued)

*Primary Examiner* — Patrick Lewis
*Assistant Examiner* — Everett White
(74) *Attorney, Agent, or Firm* — Alston & Bird LLP

(57) ABSTRACT

A degree of polymerization of cellulose ether is accurately controlled, and quality and a manufacturing process of the cellulose ether are stabilized. There is provided a method for producing depolymerized alkali cellulose having a degree of polymerization controlled, comprising at least a step of depolymerizing, in the presence of an oxygen-containing gas flow, alkali cellulose obtained by bringing a pulp into contact with an alkali solution, while measuring feeding and discharging amounts of oxygen in the oxygen-containing gas flow. There is also provided a method for producing cellulose ether, comprising at least a step of adding an etherifying agent to the depolymerized alkali cellulose having a degree of polymerization controlled.

4 Claims, 1 Drawing Sheet

(56) References Cited

OTHER PUBLICATIONS

Office Action for Chinese Application No. 201210038976.9 dated Dec. 4, 2013.
Michie, R.I.C., et al.; Kinetic Study of the Autoxidation of Cellulose Suspended in Sodium Hydroxide Solution; Journal of Polymer Science; Part A; vol. 2; 1964; pp. 2063-2083.
Partial Translation of "Cellulose No Jiten (Encyclopedia of Cellulose)", edited by the Cellulose Society of Japan and published on Nov. 10, 2000, 3 pages.
European Search Report for Application No. 12156044.5 dated Jun. 26, 2012.
European Search Report for Application No. 12156043.7 dated Jun. 22, 2012.
European Search Report for Application No. 12156045.2 dated Jun. 18, 2012.
Extended European Search Report from European Application No. 12156046.0, dated Jun. 8, 2012.
Office Action for Japanese Application No. 2012-034021 dated Oct. 21, 2014.
Office Action from Japanese Application No. 2011-034472, dated Jul. 8, 2014.
Office Action from Japanese Application No. 2011-034468, dated Jul. 8, 2014.
Office Action from U.S. Appl. No. 13/398,247 dated Sep. 4, 2014.
Office Action from U.S. Appl. No. 13/398,273 dated Aug. 28, 2014.
Office Action from U.S. Appl. No. 13/398,317 dated Aug. 28, 2014.
Office Action from U.S. Appl. No. 13/398,369 dated Aug. 28, 2014.
Office Action for U.S. Appl. No. 13/398,247 dated Mar. 24, 2015.
Office Action for U.S. Appl. No. 13/398,273 dated Apr. 10, 2015.
Notice of Allowance for U.S. Appl. No. 13/398,317 dated Apr. 23, 2015.
Office Action for U.S. Appl. No. 13/398,369 dated Apr. 23, 2015.
Office Action for Japanese Application No. 2011-034469 dated May 8, 2013.
Office Action for Japanese Application No. 2011-034471 dated May 8, 2013.

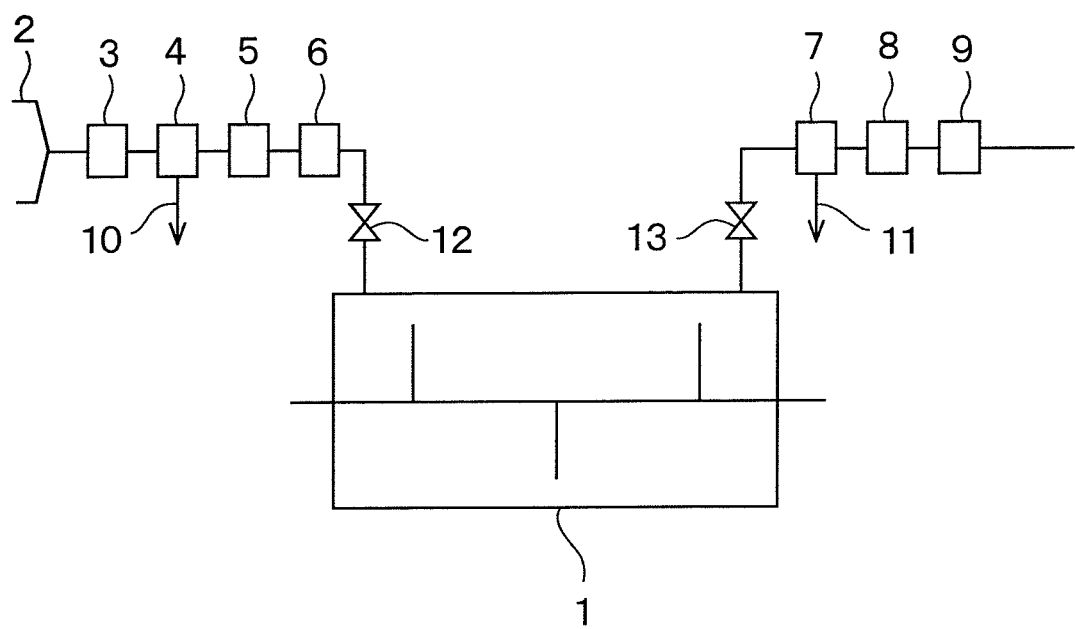

METHODS FOR PRODUCING ALKALI CELLULOSE AND CELLULOSE ETHER

BACKGROUND OF THE INVENTION

1. Field of the Invention

The invention relates to a method for controlling the degree of polymerization of alkali cellulose and to a method for producing cellulose ether for use in the fields of chemistry, medicine, etc., based on the control method.

2. Description of the Related Art

Proposed methods for reducing the viscosity of cellulose ether include a method of using hydrogen peroxide (Japanese Patent Application Examined Publication (JP-B) No. 48-19232), a method of using a volatile acid such as hydrogen halide (Japanese Patent Application Examined Publication (JP-B) No. 48-26385), a method of using ozone (Japanese Patent Application Unexamined Publication (JP-A) No. 55-145701), and a method of using gamma rays or electron beams (Japanese Patent Application Examined Publication (JP-B) Nos. 47-3964 and 47-3965).

Unfortunately, these methods are not industrially satisfactory because the reagent for use in reducing viscosity is expensive, the reagent remains in the product, or a special device is necessary.

Therefore, Japanese Patent Application Unexamined Publication (JP-A) No. 61-264001 proposes a method without these problems, which includes controlling the amount of oxygen in a reactor at the start of reaction in the process of producing alkali cellulose. The degree of polymerization of cellulose is reduced by reaction (depolymerization reaction) between oxygen and cellulose in the presence of alkali Accordingly, as the amount of oxygen increases, the viscosity of the resulting cellulose ether decreases. Since oxygen in the air can be used, this method is inexpensive and needs no special apparatus, and oxygen does not remain in the product.

According to Japanese Patent Application Unexamined Publication (JP-A) No 59-56401, after a powdery pulp is added to a reactor having an internal stirring structure, the oxygen in the reactor is first adjusted to an amount necessary for the desired viscosity, and subsequently stopped from entering the reactor to produce alkali cellulose. As the pulp comes into contact with the alkali, the pulp reacts with oxygen in the reactor so that it is depolymerized.

Japanese Patent No. 4087534 discloses a method of producing alkali cellulose, comprising the steps of: reducing the amount of oxygen in a reactor to 1 g or less per kilogram of cellulose before the addition of an alkali; and supplying oxygen with an amount required for obtaining the desired viscosity to the reactor during or after the addition of an alkali.

R. I. C. Michie, S. M. Neale: J. Polymer Sci., A2, 2063 (1964) discloses a method comprising the steps of placing a dispersion of cellulose in an aqueous sodium hydroxide solution in a vessel, allowing the cellulose to absorb oxygen at a constant temperature in the closed vessel, and measuring the pressure in the vessel to determine the absorbed amount of oxygen, which is 0.360 to 0.985 ml per gram of cellulose.

SUMMARY OF THE INVENTION

As a result of intense studies to increase the transparency of cellulose ether products, the inventor has surprisingly found that the method of controlling the amount of oxygen at the start of reaction as disclosed in Japanese Patent Application Unexamined Publication (JP-A) Nos. 61-264001 and 59-56401, causes a reduction in the transparency of low-viscosity cellulose ether having a viscosity of 100 mm$^2$/s or less, particularly 20 mm$^2$/s or less in a 2% by weight aqueous solution thereof. The inventor has also found that some of the low-viscosity cellulose ether produced by such a method dissolve in hot water and leak out of a filter in the later step of washing, resulting in relatively large amount of so-called washing loss. It is considered that at the initial stage of spraying alkali, the pulp is brought into contact with oxygen in such a state that the alkali is non-uniformly distributed on the pulp, and occurring non-uniform depolymerization degrades the chemical structure of cellulose molecules to cause a reduction in transparency. It is also considered that a part on which the alkali has been deposited has been depolymerized for the longest time, resulting in a very low degree of polymerization and leaking out as washing loss in the step of washing.

The inventor also has found that in some cases, the method disclosed in Japanese Patent No. 4087534 cannot obtain the desired viscosity, resulting in higher or lower viscosity than the desired viscosity. This is considered to be because in the step of supplying oxygen, the temperature of the alkali cellulose is not constant under the influence of various disturbances. The inventor has found that cellulose ether produced from the alkali cellulose treated by the method disclosed in R. I. C. Michie, S. M. Neale: J. Polymer Sci., A2, 2063 (1964) contains a relatively large amount of undissolved fibers and has low transparency.

The invention has been completed under the circumstances described above. For example, because of seasonal factors or different intervals between batches during reduction of the degree of polymerization by reaction of alkali cellulose with oxygen, the temperature of entering air or the temperature of the reactor varies from batch to batch. Accordingly, the invention is intended to accurately control the degree of polymerization of cellulose ether and to stabilize its quality and production process without a trial-and-error process of determining the depolymerization reaction time based on the result of the viscosity measurement of a cellulose ether solution as a final product when lack of reproducible reaction temperature results in an inconsistent reaction rate or when the production is performed using a new apparatus for the first time.

According to the invention, provided is a method for producing depolymerized alkali cellulose having a degree of polymerization controlled, comprising at least a step of depolymerizing, in the presence of an oxygen-containing gas flow, alkali cellulose obtained by bringing a pulp into contact with an alkali solution, while measuring feeding and discharging amounts of oxygen in the oxygen-containing gas flow. Also provided is a method for producing cellulose ether, comprising at least a step of adding an etherifying agent to the depolymerized alkali cellulose having a degree of polymerization controlled.

According to the invention, the degree of polymerization of cellulose ether can be controlled accurately, and quality and the production process thereof can be stabilized.

BRIEF DESCRIPTION OF THE DRAWING

FIG. 1 is a diagram showing an exemplary apparatus for carrying out the invention.

DETAILED DESCRIPTION OF THE PREFERRED EMBODIMENTS

Cellulose ether is generally produced by a method comprising the steps of adding an alkali to a raw material pulp to form alkali cellulose and adding an etherifying agent to the alkali cellulose. According to the invention, for example, alkali cellulose is placed in a vessel having a gas inlet and a gas outlet; an oxygen-containing gas is fed from the gas inlet and discharged from the gas outlet, while feeding and discharging amounts of oxygen are measured to determine the amount of oxygen absorbed by the alkali cellulose; and oxygen is removed from the vessel after the determined amount reaches the desired value. Subsequently, an etherifying agent is added thereto for the production of cellulose ether.

According to the invention, the pulp may be a raw material commonly used for the production of cellulose ether, including wood pulp and linter pulp. According to the invention, the alkali cellulose may be produced by a method comprising a step of adding dropwise or spraying an alkali solution to a powdery pulp under stirring, or a method comprising the steps of immersing a pulp sheet or pulp chips in an alkali solution and draining. In the method comprising a step of adding dropwise or spraying an alkali solution to a powdery pulp under stirring, the pulp preferably has good fluidity and preferably has an average particle size of 500 μm or less, more preferably 50 to 500 μm. The degree of polymerization of the pulp may be appropriately selected depending on the desired viscosity of cellulose ether.

In the method comprising a step of adding dropwise or spraying an alkali solution to a powdery pulp under stirring, the amount of oxygen in the reactor is preferably reduced before the production of alkali cellulose. The amount of oxygen in the reactor is preferably as low as possible, and preferably 1 g or less per kilogram of cellulose, more preferably 0.1 g or less per kilogram of cellulose. The term "1 kg of cellulose" means 1 kg of the cellulose component in the pulp.

Before the production of alkali cellulose, the control of reducing the amount of oxygen to 1 g or less per kilogram of cellulose may be carried out at any time before, after, or during the addition of the pulp to the reactor.

The method for controlling the amount of oxygen may include, but not limited to, a method comprising the steps of evacuating the reactor and then refilling the reactor with oxygen-free gas such as nitrogen gas or helium gas, or a method comprising a step of flowing oxygen-free gas for purge and replacement. The amount of oxygen can be easily calculated based on the gas law when the type of the gas in the reactor, the space volume in the reactor, the gas pressure and the gas temperature are known before the control. The calculated amount of oxygen in the reactor is preferably controlled to be 1 g or less per kilogram of cellulose. The dissolved oxygen in the alkali solution may be ignored.

According to the invention, the reactor to be used may be of any type that is capable of holding alkali cellulose and preferably has a stirring structure in the interior of the vessel, regardless of whether it is a reaction vessel for etherification.

The step of bringing the pulp into contact with the alkali solution preferably comprises at least adding the alkali solution to the pulp, and depolymerization in the presence of an oxygen-containing gas flow is preferably performed during and/or after the addition of the alkali solution. In other words, the oxygen is fed during the addition of the alkali solution and/or after the addition of the alkali solution is completed. If oxygen is fed before the alkali solution is added, the advantageous effects of the invention cannot be obtained.

The oxygen can be fed continuously or intermittently during the addition of the alkali solution and/or after the addition of the alkali solution is completed. The oxygen is preferably fed after the addition of the alkali solution proceeds to some extent, for example, after one-third or more of the total amount of the alkali solution is added, in particular, after the total amount of the alkali solution is added. When the oxygen is fed after the addition of the alkali solution proceeds to some extent as described above, the distribution of the alkali on the pulp and the depolymerization reaction become more uniform as the added amount of the alkali solution increases. The oxygen can also be fed several to several tens of minutes after the total amount of the alkali solution is added.

The oxygen may be fed using oxygen gas or oxygen gas-containing gas such as air. Air is preferably used because of its low cost and high safety.

The oxygen may be fed, for example, by a method of feeding oxygen-containing gas from one end of the reactor and discharging gas from another end. The oxygen gas flow or oxygen-containing gas flow may be generated by supply of compressed gas, by discharge or supply of gas using an exhauster, or by discharge of gas using a vacuum pump. In a horizontal cylindrical reactor, the gas feed port (inlet) and the gas discharge port (outlet) are each preferably provided at a position apart from the end of the reactor by a distance less than one fourth of the horizontal length of the reactor. The distance between the gas feed port and the gas discharge port is preferably longer than a half of the horizontal length of the reactor.

According to the invention, the feeding amount of oxygen and the discharging amount of oxygen are preferably determined by measuring the oxygen concentration in and a flow rate of the gas being fed. The oxygen concentration is preferably measured by a zirconia method or a galvanic cell method. The gas feed flow rate is preferably measured using a gas meter, a float type area flowmeter, a Pitot tube, an orifice meter, a thermal anemometer, or a vortex flowmeter. The temperature of the gas and/or the pressure of the gas are preferably measured at the same time, and the amount of oxygen under standard conditions is preferably obtained by calculation. The oxygen concentration in the discharge gas is preferably measured after the gas is cooled and dehumidified. The cooler is preferably includes, but not limited to, a plate type heat exchanger, a multitubular heat exchanger, a corrugated tube type, and a bubbling type. The cooling temperature is preferably 10° C. or less, more preferably from −10 to 10° C., even more preferably 0° C.

According to the invention, the amount of oxygen absorbed by alkali cellulose may be determined as a difference between the fed amount of oxygen and the discharged amount of oxygen.

When the difference in water vapor content between the supply and the discharge is at a negligible revel as a result of, for example, dehumidification, all of the above items do not always have to be measured. For example, the oxygen consumption rate R [NL/minute] by alkali cellulose can be calculated from any one of the following equations:

$R = Fi - Fo$, $R = Fi \times Ci - Fo \times Co$, and $R = Fi \times (Ci - Co)/(1 - Co)$, wherein Fi [NL(normal liter)/minute] represents the gas feed rate to the reactor, Ci [dimensionless] represents the oxygen concentration in the gas being fed, Fo [NL(normal liter)/minute] represents the gas discharge rate, and Co [dimensionless] represents the oxygen concentration in the gas being fed.

The negligible difference in water vapor content is preferably 1 point or less with respect to difference in volume % in the gas. It is particularly preferable that the water vapor in the gas being fed to the reactor is cooled to the temperature at which the water vapor becomes saturated, while the gas being discharged from the reactor is cooled to the same temperature as the temperature at which the water vapor becomes saturated.

FIG. 1 shows an exemplary apparatus for feeding oxygen-containing gas from one end of a stirrer-equipped reactor 1 for reacting alkali cellulose with oxygen and for discharging gas from another end. Air is introduced from an air inlet 2 by a blower 3. The introduced air is cooled and dehumidified by a cooler 4. The moisture is discharged in the form of drained water 10 to the outside of the system. The gas flow rate is measured by a flowmeter 5, and the oxygen concentration in the gas is measured by an oximeter 6. The gas discharged from the reactor 1 is cooled and dehumidified by a cooler 7. The moisture is discharged in the form of drained water 11 to the outside of the system. The gas flow rate is measured by a flowmeter 8, and the oxygen concentration in the gas is measured by an oximeter 9. The reactor 1 is provided with a gas supply valve 12 on an oxygen-containing gas feed side and with a gas discharge valve 13 on a discharge side.

According to the invention, the amount of oxygen consumed by alkali cellulose may be determined as a difference between the integrated values of the oxygen feed rate and the oxygen discharge rate. The integration method preferably comprises measuring the gas feed rate, the gas discharge rate, the oxygen concentration in the gas being fed, the oxygen concentration in the gas being discharged and so on at short time intervals; and integrating them. The time interval is preferably 1 minute or less, more preferably 30 seconds or less.

The amount of oxygen consumed by alkali cellulose depends on the degree of polymerization of the pulp used and the desired viscosity of cellulose ether. The amount of oxygen consumed by alkali cellulose is preferably from 0.1 to 10 NL (normal liters) per kilogram of cellulose. When it is less than 0.1 NL per kilogram of cellulose, the desired viscosity may not be obtained. When it is more than 10 NL per kilogram of cellulose, the degree of polymerization may be reduced excessively so that troubles may occur in the later step.

In an embodiment of the invention, it is preferable that the oxygen consumption amount for the production of cellulose ether having the desired degree of polymerization is calculated in advance. The calculation is based on the equation (1):

$$V = 22400 \times 4 \times \{(Dp_0/Dp) - 1\}/(162 \times Dp_0)$$

In the above equation, V represents the oxygen consumption amount per kilogram of the cellulose (NL/kg) in the alkali cellulose, $Dp_0$ represents the degree of polymerization before the reduction in a degree of polymerization, and Dp represents the degree of polymerization after the reduction in a degree of polymerization. The degrees of polymerization before and after the reduction in a degree of polymerization can be measured by a GPC light-scattering method. While the Dp may be the weight average degree of polymerization (Dpw) or the number average degree of polymerization (Dpn), one of them should be selected consistently so as to avoid using them together in the equation. The equation (1) is based on the fact that when the concentration of an aqueous sodium hydroxide solution used in the production of alkali cellulose is from 35 to 60% by weight, 4 moles of oxygen molecules ($O_2$) are consumed per one cleavage of one cellulose molecule (part of which is described in R. I. C. Michie, S. M. Neale; J. Polymer Sci., A2, 2063 (1964)).

Herein, the number of molecular cleavages is represented by $(Dp_0/Dp) - 1$, and cellulose is a polymer having a chemical structure in which glucose (molecular weight: 162) is polymerized. Therefore, $162 \times Dp_0$ is the molecular weight of cellulose before the reduction in degree of polymerization. If the weight of cellulose before the reduction in degree of polymerization is m kg, the number of the cellulose molecules is represented by $m/(162 \times Dp_0)$ (kgmol). If $m/(162 \times Dp_0)$ (kgmol) of cellulose molecules are each cleaved once, the consumed amount of oxygen molecules is $4 \times \{(Dp_0/Dp) - 1\} \times m/(162 \times Dp_0)$ (kgmol). This is $22400 \times 4 \times \{(Dp_0/Dp) - 1\} \times m/(162 \times Dp_0)$ (NL) when converted into oxygen gas volume under standard conditions. The oxygen consumption amount V per weight of cellulose before the reduction in degree of polymerization is calculated by dividing the above equation by m, so that the equation (1) is obtained.

When a predetermined oxygen consumption amount is detected, further absorption of oxygen is prevented by stopping the feed of oxygen and removing oxygen from the reactor. Preferred examples of the removal method include an evacuation method, an inert gas purge method, a method using a combination thereof, a method of evacuation followed by recovering pressure using inert gas, and a method in which these are repeated several times.

As for the alkali solution to be added, the alkali may include alkali hydroxide such as sodium hydroxide or potassium hydroxide, and the solvent may include water, an alcohol having 1 to 4 carbon atoms. The solvent may be preferably water. The alkali solution is preferably an aqueous alkali hydroxide solution or an alkali hydroxide solution, more preferably an aqueous alkali hydroxide solution. The concentration of the alkali solution may be preferably from 10 to 60% by weight, more preferably from 20 to 55% by weight. When the concentration of the alkali solution is less than 10% by weight, the alkali cellulose has high water content so that the etherification reaction in the later step may proceed with low efficiency. When it is more than 60% by weight, the alkali may be non-uniformly distributed in the alkali cellulose so that the cellulose ether solution may have low transparency.

The weight ratio of the alkali to the cellulose in the alkali cellulose may be changed appropriately, depending on the desired degree of ether group substitution. In consideration of the transparency of the cellulose ether solution and the efficiency of the etherification reaction in the later step, the weight ratio of the alkali to the cellulose is generally from 0.01 to 2.0, preferably from 0.5 to 1.5. One-third or more of the amount of the alkali solution to be added, which has been described for the timing of the addition of oxygen-containing gas, is one-third or more of the total amount of the alkali solution with the above weight ratio.

The production and the depolymerization reaction of the alkali cellulose are preferably performed under sufficient stirring. This makes it possible to uniformly distribute the alkali cellulose, oxygen-containing gas and heat, so that the advantageous effects of the invention can be obtained. In view of uniformity, the peripheral speed of the stirring is preferably from 0.1 to 15 m/second.

According to the invention, a depolymerization catalyst may be optionally added. Examples of the depolymerization catalyst may include cobalt chloride and benzene diazonium hydroxide. The depolymerization catalyst is preferably added in an amount of 3 mg or less per kilogram of cellulose. Even when it is added in an amount of more than 3 mg per kilogram of cellulose, the effect of the depolymerization catalyst may not change. The method of adding the depolymerization catalyst is not particularly limited. The depolymerization catalyst can preferably be added in the form of a solution in which it is dissolved in a solvent such as water and an alcohol, or in the form of an alkali solution containing it.

The depolymerization reaction may be carried out preferably at 60 to 100° C., more preferably at 70 to 90° C. When the reaction temperature is less than 60° C., the depolymerization reaction may proceed slowly so that it may take a long time to complete the reaction. When it is more than 100° C., the aqueous cellulose ether solution may have low transparency.

The depolymerization temperature is preferably changed during the depolymerization operation, and in particular, preferably includes a temperature increase during the depolymerization operation. This is because keeping the temperature constant may require control by using a jacket or the like, thereby generating an energy cost necessary for heating or cooling, which is uneconomical. During the depolymerization operation, the temperature of the alkali cellulose may increase because of the exothermic reaction of the alkali cellulose with oxygen.

After the production and the depolymerization reaction of the alkali cellulose are completed, an etherification reaction may be carried out in a generally used method to form cellulose ether, which may be subjected to a purification step.

According to the invention, examples of cellulose ether include methyl cellulose, hydroxypropylmethyl cellulose, hydroxyethylmethyl cellulose and hydroxypropyl cellulose.

According to the invention, examples of the etherifying agent for alkali cellulose include, but are not limited to, methyl chloride, propylene oxide and ethylene oxide.

EXAMPLES

Hereinafter, the invention will be more specifically described with reference to examples and comparative examples. It should not be construed that the invention is limited to the examples.

Example 1

Hydroxypropylmethyl cellulose having a viscosity of 50 mPa·s in an aqueous 2% by weight solution and a degree of polymerization (Dpw) of 189 was planned to be produced from a powdery pulp having a degree of polymerization (Dpw) of 374. The amount of oxygen consumed by alkali cellulose was calculated from the equation (1) to be 1.45 NL (normal liters) per kilogram of cellulose.

A powdery pulp having a degree of polymerization (Dpw) of 374 was placed in an amount corresponding to 5.5 kg of cellulose in a reactor as shown in FIG. 1, comprising an internal stirring structure with a volume of 144 liters, a gas (air) feed valve 12, a system for measuring the amount of oxygen being fed (represented by 5 and 6 in FIG. 1), a gas discharge valve 13, and a system for measuring the amount of oxygen being discharged (represented by 8 and 9 in FIG. 1). The gauge pressure in the reactor was reduced to −0.096 MPa and then returned to 0 MPa using nitrogen gas, and this process was repeated twice.

Subsequently, under stirring at a peripheral speed of 8 m/second in the vicinity of the peripheral body face, 14.0 kg of an aqueous 49% by weight sodium hydroxide solution was added over 20 minutes. Subsequently, the jacket temperature was set at 90° C., and when the internal temperature of the reactor reached 70° C., air was entered into the reactor at a rate of 5.5 NL/minute. The coolers 4 and 7 were kept at 5° C. The oxygen concentration on the feed side was 20.9%, and the oxygen concentration on the discharge side was 0% at the initial stage and increased as the time passed. The amount of oxygen consumed by the alkali cellulose was determined from the measured values of the oxygen feed rate and the oxygen discharge rate at intervals of 1 minute. When the oxygen consumption amount reached 1.45 NL per kilogram of cellulose 50 minutes after the start of the air supply, the feed of the gas was stopped, and the gauge pressure in the reactor was reduced to −0.096 MPa by a vacuum pump. To the reactor were added 11 kg of methyl chloride and 2.8 kg of propylene oxide. They were allowed to react at 60 to 90° C. for 110 minutes. After the reaction, the crude product was washed with hot water and then dried.

The obtained hydroxypropylmethyl cellulose had a methoxy DS of 1.90 and a hydroxypropoxy MS of 0.25. A viscosity in an aqueous 2% by weight solution thereof was measured in accordance with the capillary viscometer method in the Japanese Pharmacopoeia and found to be 15 mm$^2$/s. A degree of polymerization (Dpw) was measured by the GPC light-scattering method and found to be 189. An aqueous 2% by weight solution of the obtained hydroxypropylmethyl cellulose had a light transmittance of 97.0% as measured with a photoelectric colorimeter Model PC-50 using a cell length of 20 mm and a wavelength of 270 nm.

Example 2

Hydroxypropylmethyl cellulose having a viscosity of 100 mPa·s in an aqueous 2% by weight solution thereof and a degree of polymerization (Dpw) of 225 was planned to be produced from a powdery pulp having a degree of polymerization (Dpw) of 374. The amount of oxygen consumed by alkali cellulose was calculated from the equation (1) to be 0.98 NL per kilogram of cellulose.

The hydroxypropylmethyl cellulose was produced in the same manner as in Example 1 except that the feed of the gas was stopped when the oxygen consumption amount reached 0.98 NL per kilogram of cellulose 35 minutes after the start of the air supply.

Substitution degrees, a viscosity in an aqueous 2% by weight solution, a degree of polymerization (Dpw), and light transmittance of the obtained hydroxypropylmethyl cellulose are shown in Table 1.

Example 3

Hydroxypropylmethyl cellulose having a viscosity of 1,130 mP·s in an aqueous 2% by weight solution thereof and a degree of polymerization (Dpw) of 350 was planned to be produced from a powdery pulp having a degree of polymerization (Dpw) of 374. The amount of oxygen consumed by alkali cellulose was calculated from the equation (1) to be 0.10 NL per kilogram of cellulose.

The hydroxypropylmethyl cellulose was produced in the same manner as in Example 1 except that the feed of the gas was stopped when the oxygen consumption amount reached 0.10 NL per kilogram of cellulose 5 minutes after the start of the air supply.

Substitution degrees, a viscosity in an aqueous 2% by weight solution, a degree of polymerization (Dpw), and light transmittance of the obtained hydroxypropylmethyl cellulose are shown in Table 1.

Example 4

Hydroxypropylmethyl cellulose having a viscosity of 15 mPa·s in an aqueous 2% by weight solution and a degree of polymerization (Dpw) of 127 was planned to be produced from a powdery pulp having a degree of polymerization (Dpw) of 374. The amount of oxygen consumed by alkali cellulose was calculated from the formula ( ) to be 2.88 NL per kilogram of cellulose.

The hydroxypropylmethyl cellulose was produced in the same manner as in Example 1 except that the feed of the gas was stopped when the oxygen consumption amount reached 2.88 NL per kilogram of cellulose 86 minutes after the start of the air supply.

Substitution degrees, a viscosity in an aqueous 2% by weight solution, a degree of polymerization (Dpw), and light transmittance of the obtained hydroxypropylmethyl cellulose are shown in Table 1.

Example 5

Hydroxypropylmethyl cellulose having a viscosity of 3 mPa·s in an aqueous 2% by weight solution thereof and a degree of polymerization (Dpw) of 49 was planned to be produced from a powdery pulp having a degree of polymerization (Dpw) of 374. The amount of oxygen consumed by alkali cellulose was calculated from the formula (1) to be 10.0 NL per kilogram of cellulose.

The hydroxypropylmethyl cellulose was produced in the same manner as in Example 1 except that the feed of the gas was stopped when the oxygen consumption amount reached 10.0 NL per kilogram of cellulose 192 minutes after the start of the air supply.

Substitution degrees, a viscosity in an aqueous 2% by weight solution, a degree of polymerization (Dpw), and light transmittance of the obtained hydroxypropylmethyl cellulose are shown in Table 1.

Comparative Example 1

Hydroxypropylmethyl cellulose having a viscosity of 50 mPa·s in an aqueous 2% solution and a degree of polymerization (Dpw) of 189 was planned to be produced from a powdery pulp having a degree of polymerization (Dpw) of 374. The hydroxypropylmethyl cellulose was produced in the same manner as in Example 1 except that the amount of oxygen being fed and the amount of oxygen being discharged were not measured. Since there was no basis for determining when the feed of the gas should be stopped, the feed of the gas was stopped 40 minutes after the start of the air supply as a trial. The obtained hydroxypropylmethyl cellulose had a viscosity of 60 mPa·s in an aqueous 2% by weight solution thereof and a degree of polymerization (Dpw) of 199, which were different from the desired values, 50 mPa·s for a viscosity in an aqueous 2% by weight solution and 189 for a degree of polymerization (Dpw).

Accordingly, in the next batch, the same procedure as in the previous batch was performed except that the feed of the gas was stopped 60 minutes after the start of the air supply, taking the result of the previous batch into consideration. The obtained hydroxypropylmethyl cellulose had a viscosity of 40 mPa·s in an aqueous 2% by weight solution and a degree of polymerization (Dpw) of 178, which were still different from the desired values, 50 mPa·s for a viscosity in an aqueous 2% by weight solution and 189 for a degree of polymerization (Dpw).

Accordingly, in the further next batch, the same procedure as in the previous batch was performed except that the feed of the gas was stopped 50 minutes after the start of the air supply. The obtained hydroxypropylmethyl cellulose had a viscosity of 50 mPa·s in an aqueous 2% by weight solution and a degree of polymerization (Dpw) of 189, which were same as the desired values.

As described above, hydroxypropylmethyl cellulose having the desired degree of polymerization was finally obtained. However, trial production was preliminarily carried out in two batches so that failed products not having the desired degree of polymerization were produced and additional material and labor costs were incurred in the trial production. The time required from the start of the production to the determination of the adequate degree of polymerization was three times as long as that in Example 1.

Comparative Example 2

Hydroxypropylmethyl cellulose having a viscosity of 60 mPa·s in an aqueous 2% by weight solution thereof and a degree of polymerization (Dpw) of 189 was planned to be produced from a powdery pulp with a polymerization degree Dpw of 374. The amount of oxygen consumed by alkali cellulose was calculated from the equation (1) to be 1.45 NL per kilogram of cellulose.

A powdery pulp having a degree of polymerization (Dpw) of 374 was placed in an amount corresponding to 5.5 kg of cellulose in a reactor comprising an internal stirring structure with a volume of 144 liters. The gauge pressure in the reactor was reduced to −0.096 MPa and then returned to 0 MPa using nitrogen gas, and this process was repeated twice.

Subsequently, under stirring at a peripheral speed of 8 m/second in the vicinity of the peripheral body face, 14.0 kg of an aqueous 49% by weight sodium hydroxide solution was added over 20 minutes. Subsequently, the jacket temperature was set at 90° C., and the pressure in the reactor was reduced to −94 kPa by evacuation. When the internal temperature of the reactor reached 70° C., air was entered. The volume of air entered was converted into the amount of oxygen, which was 1.45 NL per kilogram of cellulose. The gas discharge valve was closed all the time, and stirring was performed without evacuation. Fifty minutes after air was entered, the gauge pressure in the reactor was reduced to −0.096 MPa by a vacuum pump, and 11 kg of methyl chloride and 2.8 kg of propylene oxide were added thereto. They were allowed to react at 60° C. to 90° C. for 110 minutes. Substitution degrees, a viscosity in an aqueous 2% by weight solution, a degree of polymerization (Dpw), and light transmittance of the obtained hydroxypropylmethyl cellulose are shown in Table 1.

TABLE 1

| | | amount of oxygen consumed by alkali cellulose (NL/kg cellulose) | hydroxypropylmethyl cellulose ||||| 
|---|---|---|---|---|---|---|---|
| | | | methoxy group (DS) | hydroxypropoxy group (MS) | viscosity in aqueous 2% by weight solution (mPa·s) | degree of polymerization (Dpw) | transmittance in aqueous 2% by weight solution (%) |
| Example1 | | 1.45 | 1.90 | 0.25 | 50 | 189 | 97.0 |
| Example2 | | 0.98 | 1.90 | 0.25 | 100 | 225 | 97.5 |
| Example3 | | 0.10 | 1.90 | 0.25 | 1130 | 350 | 98.0 |
| Example4 | | 2.88 | 1.90 | 0.25 | 15 | 127 | 97.5 |
| Example5 | | 10.0 | 1.90 | 0.25 | 3 | 49 | 97.0 |
| Comp. Ex. 1 | 1st trial | not measured | 1.90 | 0.25 | 60 | 199 | 97.0 |
| | 2nd trial | not measured | 1.90 | 0.25 | 40 | 178 | 97.0 |

TABLE 1-continued

| | | amount of oxygen consumed by alkali cellulose (NL/kg cellulose) | hydroxypropylmethyl cellulose | | | | |
|---|---|---|---|---|---|---|---|
| | | | methoxy group (DS) | hydroxypropoxy group (MS) | viscosity in aqueous 2% by weight solution (mPa · s) | degree of polymerization (Dpw) | transmittance in aqueous 2% by weight solution (%) |
| | 3rd trial | not measured | 1.90 | 0.25 | 50 | 189 | 97.0 |
| Comp. Ex. 2 | | not measured | 1.90 | 0.55 | 80 | 199 | 94.0 |

As shown in Examples 1 to 5, the degree of polymerization of hydroxypropylmethyl cellulose was successfully regulated by measuring the amount of oxygen being fed to the alkali cellulose and the amount of oxygen being discharged and controlling the oxygen consumption amount. However, in Comparative Example 1, since the reaction conditions for achieving the desired viscosity and degree of polymerization were determined by trial and error, undesirable products were produced in the trial and error stages and additional material and labor costs were incurred. In addition, a long time was needed from the start of the production to the determination of the adequate degree of polymerization.

In Comparative Example 2, the desired degree of polymerization (Dpw) of 189 was not achieved even though the calculated amount of oxygen was entered. This is considered that because gas was not discharged from the reactor, a decrease in the amount of oxygen remaining in the reactor caused a decrease in the oxygen consumption rate so that the total amount of oxygen entered could not be consumed. Also in the method of Comparative Example 2, the obtained hydroxypropylmethyl cellulose was found to have a reduced light transmittance.

The invention claimed is:

1. A method for producing cellulose ether, comprising at least the steps of:

depolymerizing, in the presence of an oxygen-containing gas flow, alkali cellulose obtained by bringing a pulp into contact with an alkali solution, while calculating a consumed amount of oxygen by alkali cellulose from measured values of feeding and discharging amounts of oxygen in the oxygen-containing gas flow, to produce depolymerized alkali cellulose having a degree of polymerization controlled, wherein feeding of the oxygen-containing gas flow is stopped when the consumed amount of oxygen by the alkali cellulose reaches 0.1 to 10 normal liter per kilogram of cellulose contained by the pulp and used in production of the alkali cellulose, wherein the consumed amount of oxygen by the alkali cellulose is calculated from equation (1):

$$V=22400\times 4\times \{(Dp_0/Dp)-1\}/(162\times Dp_0),$$

wherein the units for V are normal liter/kg and V represents the consumed amount of oxygen per kilogram of cellulose in the pulp used in production of the alkali cellulose, and $Dp_0$ and $Dp$ represent degrees of polymerization before and after reduction in a degree of polymerization, respectively; and adding an etherifying agent to the depolymerized alkali cellulose.

2. The method according to claim 1, wherein the step of depolymerizing comprises depolymerizing the alkali cellulose formed during or after an addition of the alkali solution to the pulp.

3. The method according to claim 2, wherein depolymerizing the alkali cellulose starts after one third or more of the addition of the alkali solution is completed.

4. The method according to claim 1, wherein the alkali cellulose is depolymerized at a temperature of 60° C. to 100° C.

* * * * *